Patented Sept. 19, 1950

2,523,026

UNITED STATES PATENT OFFICE 2,523,026

ALUMINA-BASED PHOSPHOR

Shannon Jones, East Cleveland, Ohio, assignor to General Electric Company, a corporation of New York No Drawing. Application February 4, 1949, Serial No. 74,717

5 Claims. (Cl. 252—301.4)

My invention relates to fluorescent materials or phosphors, and more particularly to phosphors comprising alumina as a major ingredient. The invention also relates to a method of preparing such phosphors.

An object of my invention is to provide phosphor compositions having an emission band in the red portion of the spectrum. A further object is to provide phosphors of that type which are efficiently excited by 2537 Å. radiation. Still another object is to provide a phosphor of that type which is capable of, though not limited to, use in a gaseous electric discharge lamp such as the well-known fluorescent lamps of low pressure positive column type containing a few millimeters of a rare gas like argon or krypton, together with mercury. Other objects and advantages of my invention will appear from the following description of species thereof.

According to the present invention, I have discovered that certain novel alumina-based phosphors having a rather narrow emission band peaking at approximately 6800 Å. and efficiently excited by 2537 Å. radiation can be prepared by firing a mixture of alumina, lithia and iron oxide, with or without silica. While the addition of silica enhances the efficiency somewhat, it may be omitted when desired. On the other hand, the presence of lithia and iron oxide in the phosphor is necessary for good results. Moreover, lithia is specific in that respect since satisfactory results were not obtained by substituting other alkaline oxide such as the oxides of sodium, potassium and calcium.

I have obtained good results with compositions containing the above-mentioned oxides in the following range of proportions:

| | Mol |
|---|---|
| $Al_2O_3$ | 1.00 |
| $Li_2O$ | .10–.75 |
| $SiO_2$ | 0–.4 |
| $Fe_2O_3$ | .0004–.016 |

A broad maximum of brightness appears to exist in a composition approximately as follows:

| | Mol |
|---|---|
| $Al_2O_3$ | 1.00 |
| $Li_2O$ | .32 |
| $SiO_2$ | .14 |
| $Fe_2O_3$ | .002 |

A suitable batch as prepared for firing may be conveniently made up by mixing 100 grams of $Al(OH)_3$
15 grams of $Li_2CO_3$
6 grams of hydrated precipitated silica containing about 90 per cent $SiO_2$
0.3 grams of a precipitated ferric hydroxide or hydrated ferric oxide containing about 48 per cent iron, and equivalent to the formula $Fe_2O_3.4H_2O$.

These materials are dry and free flowing and mix readily by shaking, rolling or ball milling. Other materials which break down to oxides may be used in place of the above batch materials. Such batch materials are, for example, carbonates, nitrates and salts of organic acids.

The firing temperature is not critical but I have obtained best results in the range of 1100–1400° C., with an optimum at about 1300° C. The firing time is not critical. In a five gram batch, some fluorescence has been obtained by firing for one minute. On the other hand, some batches have been fired for as long as 12 hours with very good results. However, in general, firing times of 1 or 2 hours give good results, which would ordinarily be sufficient to penetrate the batch. The firing is done in open containers, that is, under oxidizing conditions.

While a phosphor prepared as described above is entirely suitable for use in certain applications, the presence of lithia minimizes its suitability for use in a fluorescent lamp. The alkalinity causes curdling of nitrocellulose lacquer suspensions if the slightest traces of water are present, and the maintenance of lamps using the phosphor is not as good as would be desired. This characteristic may be overcome by removing some lithia from the phosphor in any suitable manner. Lithia may be leached from the phosphor, more particularly from the surface of the phosphor particles, by protracted washing with hot water. In one case about 6 per cent of the lithia content was removed by leaching for several days with hot water. The resulting phosphor shows no diminution in brightness. In case it is desired to remove any water which may have been absorbed by the phosphor, it may be reheated at any suitable temperature up to and including the original firing temperature with substantially no loss in brightness. The leaching of lithia from the phosphor has markedly improved the maintenance of lamps containing the phosphor as a coating on the inner surface of the lamp bulb or envelope. Lamps containing unleached phosphor dropped 50 per cent in lumens per watt from 2 to 100 hours, whereas lamps with leached phosphor dropped only 15 per cent in the same period.

Since leaching with water is a slow procedure, other suitable agents may be used, such as hydrochloric acid or benzoic acid. Hydrochloric acid acts rapidly to remove much of the lithia as well as part of the iron and part of the alumina. However, the fluorescent brightness is not visibly reduced.

Leaching of a phosphor having the optimum composition stated above by strong hydrochloric acid may result in removal of, for example, about 68 per cent of the lithia, 18 per cent of the iron oxide and 13 per cent of the alumina originally present in the phosphor, without substantial loss in brightness. Reheating this phosphor to temperatures of 700° C., 800° C. and 900° C. likewise results in no obvious difference in brightness. However, firing this phosphor at 1160° C. for 16 hours results in a reduction in brightness to a degree approximating what would have been obtained had the original batch contained the ingredients in the proportions existing in the phosphor after leaching.

Apparently in that case the refiring was equivalent to an initial firing of the ingredients in the proportions existing in the leached phosphor. On the other hand, when the leaching is performed with weaker solutions of hydrochloric acid so as to remove less lithia, the phosphor may be refired at the original firing temperature with substantially no loss in brightness.

The phosphor comprising my invention is readily reproducible and is not readily poisoned by small amounts of the more common elements.

What I claim as new and desire to secure by Letters Patent of the United States is:

1. The method of preparing an alumina-based phosphor which comprises firing at a temperature of approximately 1100–1400° C. a mixture of compounds of at least the first three elements of the group consisting of aluminum, lithium, iron and silicon, said compounds being of the group consisting of oxides of the said elements and compounds which upon heating break down to yield the oxides of the said elements in proportions of approximately 1 mol $Al_2O_3$, 0.1 to .75 mol $Li_2O$, 0 to 0.4 mol $SiO_2$ and .0004 to .016 mol $Fe_2O_3$.

2. The method of preparing an alumina-based phosphor which comprises firing at a temperature of approximately 1100–1400° C. a mixture of compounds of at least the first three elements of the group consisting of aluminum, lithium, iron and silicon, said compounds being of the group consisting of oxides of the said elements and compounds which upon heating break down to yield the oxides of the said elements in proportions of approximately 1 mol $Al_2O_3$, 0.1 to .75 mol $Li_2O$, 0 to 0.4 mol $SiO_2$ and .0004 to .016 mol $Fe_2O_3$, and subsequently leaching lithium oxide from the surface of the phosphor particles.

3. The method of preparing an alumina-based phosphor which comprises firing at a temperature of approximately 1100–1400° C. a mixture of compounds of at least the first three elements of the group consisting of aluminum, lithium, iron and silicon, said compounds being of the group consisting of oxides of the said elements and compounds which upon heating break down to yield the oxides of the said elements in proportions of approximately 1 mol $Al_2O_3$, 0.1 to .75 mol $Li_2O$, 0 to 0.4 mol $SiO_2$ and .0004 to .016 mol $Fe_2O_3$, and subsequently leaching lithium oxide from the surface of the phosphor particles, and then reheating the phosphor to drive out water introduced during leaching.

4. An alumina-based phosphor consisting of the reaction product of firing at a temperature of about 1100–1400° C. about one mol of alumina, 0.1 to 0.75 mol of lithium oxide, 0 to 0.4 mol of silica and .0004 to .016 mol of ferric oxide.

5. An alumina-based phosphor consisting of the reaction product of firing at a temperature of about 1100–1400° C. about one mol of alumina, 0.1 to 0.75 mol of lithium oxide, 0 to 0.4 mol of silica and .0004 to .016 mol of ferric oxide, said phosphor having its surface substantially free of lithia.

SHANNON JONES.

REFERENCES CITED

The following references are of record in the file of this patent:

Tiede-Luders Article in Berichte Der Chemische Gesellschaft 66 (1933), pp. 1681–1689.